(12) United States Patent
Miyazaki et al.

(10) Patent No.: US 6,353,709 B1
(45) Date of Patent: Mar. 5, 2002

(54) CAMERA CAPABLE OF DETECTING AN ABNORMALITY

(75) Inventors: Satoshi Miyazaki; Masahiro Dai, both of Tokyo (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/525,286

(22) Filed: Mar. 15, 2000

(30) Foreign Application Priority Data

Mar. 16, 1999 (JP) ............................................. 11-070737

(51) Int. Cl.[7] ............................................. C03B 17/00
(52) U.S. Cl. ....................... 396/48; 396/134; 396/247; 396/404; 396/281
(58) Field of Search ..................... 396/48, 133, 134, 396/247, 404, 409, 281

(56) References Cited

U.S. PATENT DOCUMENTS

| | | | | |
|---|---|---|---|---|
| 4,299,469 A | * | 11/1981 | Kurosu et al. | 396/266 |
| 5,181,063 A | * | 1/1993 | Tagami et al. | 396/235 |
| 5,600,390 A | * | 2/1997 | Tsuru et al. | 396/133 |
| 5,614,972 A | * | 3/1997 | Wakabayashi et al. | 396/135 |

FOREIGN PATENT DOCUMENTS

JP 2669850 7/1997

* cited by examiner

Primary Examiner—Russell Adams
Assistant Examiner—Arthur A Smith
(74) Attorney, Agent, or Firm—Frishauf, Holtz, Goodman, Langer & Chick, P.C.

(57) ABSTRACT

A camera capable of detecting an abnormality has photographing operation programs, an abnormality detection program, and a checking operation program installed therein. The photographing operation programs cause a plurality of mechanisms included in the camera to act sequentially. The abnormality detection program detects an abnormality in an action of a predetermined one of the plurality of mechanisms. Responsive to detection of the abnormality in the action of the predetermined mechanism, as detected by the abnormality detection program, the checking operation program causes the predetermined mechanism alone to act again for checking of the predetermined mechanism under conditions different from those under which the predetermined mechanism has acted to have the abnormality detected by the abnormality detection program.

11 Claims, 7 Drawing Sheets

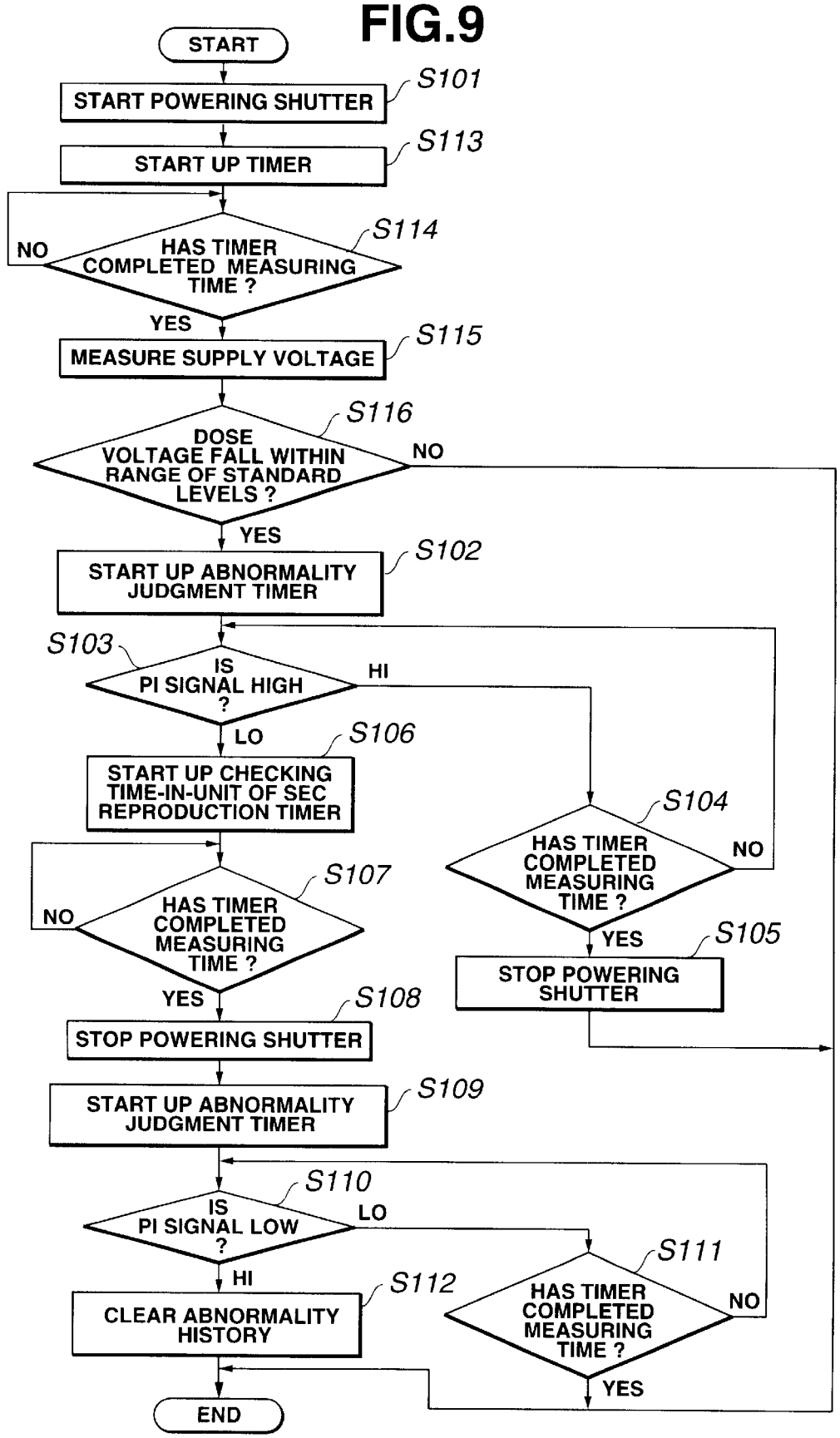

CAMERA CAPABLE OF DETECTING AN ABNORMALITY

BACKGROUND OF THE INVENTION

1. Field of the Invention

The present invention relates to a camera, and more particularly, to a sequence of controlling a predetermined action of a camera, which sequence has been executed for performing photography and in which an abnormality has occurred.

2. Description of the Related Art

Cameras for performing photography generally use system described below to judge whether a shutter unit acts normally during photography.

Namely, sectors constituting part of the shutter unit have a slit formed at a predetermined position thereof. A photo-interrupter for detecting the slit is included. When a detection signal is output from the photo-interrupter, it is judged that the shutter unit acts normally.

When an output from the photo-interrupter is not detected, it is judged that the shutter unit has an abnormality. If an abnormality is thus detected, control is given so that a camera will be disabled from operating for fear the same event may be repeated, and thus placed in a non-operable state.

In a camera disclosed in Japanese Patent Publication No. 2669850, as long as an abnormality in an action is detected once, the camera is not placed in the non-operable state. After an abnormality in a predetermined action is detected a plurality of times, the camera is disabled from operating. As long as an abnormal action is detected only once, the camera remains usable thereafter. This helps a user to become conscious of the abnormal action of the camera thereafter and contributes to improvement in the user's maneuverability.

However, the means disclosed in the Japanese Patent Publication No. 2669850 does not disable the camera from operating as long as an abnormality in the action of the shutter unit is detected only once. Even if the camera malfunctions, the same sequence is executed again. The camera would operate as if it were normal until the abnormality is detected a plurality of times. Other different defects may occur until the camera is placed in the non-operable state because the abnormality in the action has been detected a plurality of times.

The above will be described by considering a practical example. That is to say, assume that when a shutter unit fails, an abnormality is detected for the first time. At this time, the camera can still execute operations for the next photography.

Normally, prior to photography, a user often actuates a release without loading a predetermined film cartridge (not shown) in a camera body to thus carry out so-called test imaging (blind exposure).

If the camera is of a type in which even when an abnormality is detected once, the camera is not disabled from operating immediately, the user will not become aware of the fact that the camera malfunctions and therefore operates abnormally. The user may therefore load a film cartridge in preparations for actual photography.

In this case, since the camera is actually abnormal (malfunctions), an abnormality is detected for the second time during photography of the first frame. The camera is then placed in the non-operable state for the first time.

According to the system disclosed in the Japanese Patent Publication No. 2669850, discovery of an abnormality in an action of a camera is likely to be delayed. This poses a problem.

If this kind of event occurs, the user not only wastes film, but also loses a chance of exposure. Besides, the user who thought that the camera acted normally at the time of test imaging (blind exposure) will be disappointed because the camera has malfunctioned in reality. The user will distrust the camera from that time. This will affect the user's photographic activity using the camera.

SUMMARY OF THE INVENTION

An object of the present invention is to provide a camera in which when an abnormality is detected in a photographing operation, an appropriate checking operation is executed automatically. It is then judged whether the detected abnormality in the operation is attributable to the malfunction of the camera. A user can therefore accurately recognize the state of the camera.

Briefly, according to the first aspect of the present invention, a camera capable of detecting an abnormality has photographing operation section, an abnormality detecting section, and a checking operation section. The photographing operation section causes a plurality of mechanisms included in the camera to act sequentially. The abnormality detecting section detects an abnormality in an action of a certain one of the plurality of mechanisms. Responsive to detection of an abnormality in the action of the certain mechanism achieved by the abnormality detecting section, the checking operation section causes the certain mechanism alone to act again for checking under conditions different from those under which the certain mechanism has acted to have the abnormality detected by the abnormality detecting section.

According to the second aspect of the present invention, a camera capable of detecting an abnormality has a photographing section, an abnormality detecting means, a checking operation section, an abnormality judging section, and a photography disabling section. The photographing section executes a series of photographing operations (a photographing sequence). The abnormality detecting section detects an abnormal member during the photographing sequence. Responsive to detection of an abnormal action of said abnormal member, which is involved in any operation belonging to the photographing sequence, achieved by the abnormality detecting section, the checking operation section executes a checking operation for the abnormal member under conditions different from those under which the operation belonging to the photographic sequence is executed. The abnormality judging section judges from the results of the checking operation executed by the checking operation section whether the abnormal member detected by the abnormality detecting section is still abnormal. When the abnormality judging section judges from the results of the judgment made by the abnormality judging section that the abnormal member is still abnormal, the photography disabling section disables the photographic operations of the camera.

According to the third aspect of the present invention, a camera capable of detecting an abnormality in an action involved in a photographing operation has an abnormality detecting section, a checking operation section, and an abnormality persistence judging section. The abnormality detecting section detects an abnormality in at least one of a plurality of actions involved in a series of photographing operations (a photographing sequence) initiated with a manipulation performed for initiating the photographing operations. Responsive to detection of an abnormality in the certain action achieved by the abnormality detecting section, the checking operation section forcibly executes a photographing operation involving the action, in which an abnormality is detected, according to predetermined contents immediately after the detection of the abnormality. The abnormality persistence judging section judges from the results of the operation executed by the checking operation section according to the predetermined contents whether the abnormality in the action persists.

These and other objects of the present invention and the advantages thereof will be apparent from the description below.

According to the present invention, there is provided a camera in which if an abnormality is detected in a photographic operation, an appropriate checking operation is executed automatically. It is reliably judged whether the detected abnormality in the operation is attributed to the malfunction of the camera. A user can therefore accurately recognize the state of the camera.

BRIEF DESCRIPTION OF THE DRAWINGS

FIG. 9 is a flowchart describing another variant of the checking operation to be executed when an abnormality is detected in the exposure operation of the camera in accordance with an embodiment of the present invention.

DESCRIPTION OF THE PREFERRED EMBODIMENT

A camera in accordance with the present invention has all the components thereof controlled by a control circuit 11 serving as a control means and having a microprocessor. The control circuit 11 controls various operations according to programs stored in advance in a memory such as a ROM. The operations include an exposure operation, film feed operations, a clutch switching operation, a pop-up strobe unit thrust/plunge operation, and a photographic lens drive operation or an automatic open/close type lens barrier open/close operation. The exposure operation involves, for example, the actions of a shutter unit and the actions of aperture blades. The clutch switching operation switches directions of film feed. The photographic lens drive operation involves the power varying action of a zoom lens and the focusing action of a focusing lens. The control circuit 11 also controls input signals originating from various switches.

Figure 1:
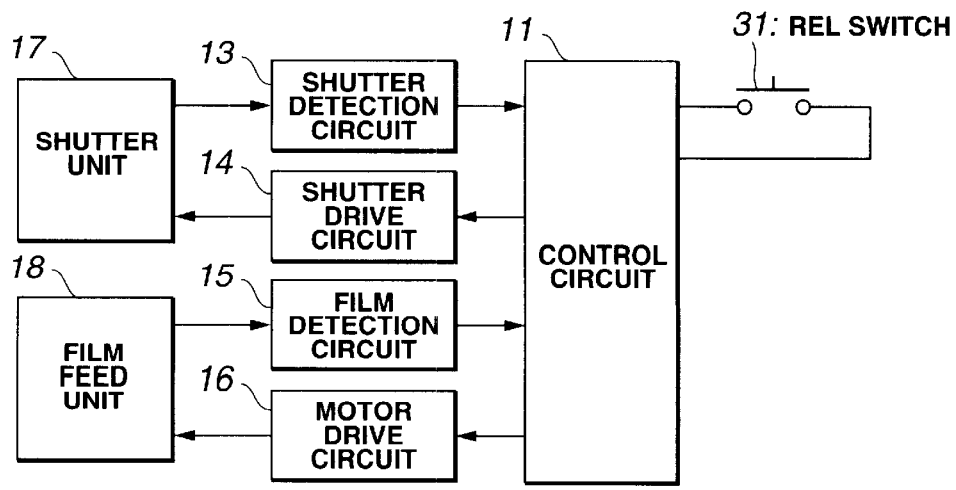
FIG. 1 is a block diagram showing a major portion of the electrical internal configuration of a camera in accordance with an embodiment of the present invention.

Electrically connected to the control circuit 11 are, as shown in FIG. 1, various kinds of electric circuits, for example, a shutter drive circuit 14, a shutter detection circuit 13, a motor drive circuit 16, and a film detection circuit 15 as well as various kinds of switches, for example, a release switch 31. The shutter drive circuit 14 drives a plunger or the like included in a shutter unit 17 (to be detailed later). The shutter detection circuit 13 includes a photo-interrupter (PI) for detecting the state of sectors included in the shutter unit 17. The motor drive circuit 16 drives a film feed motor or the like included in a film feed unit 18 that acts in a predetermined manner to feed a film. The film detection circuit 15 includes a photo-reflector (PR) or the like for detecting the state of the film feed unit 18 or the position of a film. The release switch 31 generates an instruction signal for instructing start of an exposure operation.

The film feed unit 18 is a mechanism for feeding a film from a film cartridge loaded at a predetermined position inside the camera. The film feed unit 18 comprises various members including a drive motor, and executes predetermined film feed operations including a film wind operation and a film rewind operation.

The shutter unit 17 is a mechanism for adjusting an amount of light to which a picture screen of a film is exposed, and comprises various members including the shutter detection circuit 13. The various members also include sectors, a solenoid, a plunger, and a photo-interrupter. The shutter unit 17 executes a predetermined exposure operation.

Now, the configuration of the shutter unit 17 included in the camera will be described below with reference to FIG. 2.

The shutter unit 17 in the camera comprises various members including a solenoid 27, a plunger 27a, sectors 21 and 22, a sector lever 25, part of the shutter detection circuit 13, and a photo-interrupter 29 serving as an abnormality detector. These various members are located at predetermined positions on a shutter base plate (not shown) fixed to a camera body inside the camera. The shutter base plate has an aperture 20 for exposure. The center of the aperture 20 is aligned with the optical axes of photographic lenses (not shown).

Sector pins 23 and 24 are implanted in the shutter base plate near the aperture 20 of the shutter base plate. The sector pins 23 and 24 are fitted into holes bored in the proximal parts of the sectors 21 and 22 formed with two thin plate members shaped substantially like a half moon. The sectors 21 and 22 are thus supported so that they can freely pivot relative to the shutter base plate between closed positions and open positions. At the closed positions, the sectors close the aperture 20. At the open positions, the sectors open the aperture 20.

Moreover, a sector lever 25 shaped substantially like the letter L is journaled in the shutter base plate near the sectors 21 and 22 so that it can pivot freely. A pin 25b is implanted in the tip of one arm of the sector lever 25. The pin 25b is fitted in cam grooves bored in the proximal parts of the sectors 21 and 22.

A pin 25a is implanted in the tip of the other arm of the sector lever 25. The pin 25a is located to abut on the distal surface of the plunger 27a of the solenoid 27.

An aperture spring 26 is connected between the other arm of the sector lever 25 and a fixed portion of the shutter base plate (not shown). A constraining force exerted by the aperture spring 26 works in a direction of arrow X1 in FIG. 2 or FIG. 3 and constrains the sector lever 25 to rotate counterclockwise in FIG. 2 or FIG. 3. The sectors 21 and 22 are constrained to move in directions permitting the aperture 20 to open.

A repulsion spring 28 is connected between the plunger 27a and a fixed portion of the shutter base plate (not shown). The repulsion spring 28 constrains the plunger 27a to move in a direction of repulsion, that is, a direction of arrow X2 in FIG. 2 or FIG. 3. The pin 25a implanted in the other arm of the sector lever 25 abuts on the distal surface of the plunger 27a. The counterclockwise rotation of the sector lever 25 caused by the constraining force of the aperture spring 26 is therefore restricted by the plunger 27a constrained to move in the direction of arrow X2 due to the constraining force of the repulsion spring 28.

When driven by the shutter drive circuit 14 under the control of the control circuit 11, the plunger 27a makes a sucking action or freeing action. This causes the sector lever 25 to rotate in the predetermined direction. The sectors 21 and 22 turn in the predetermined directions accordingly. The aperture 20 is thus opened or closed.

Figure 2:
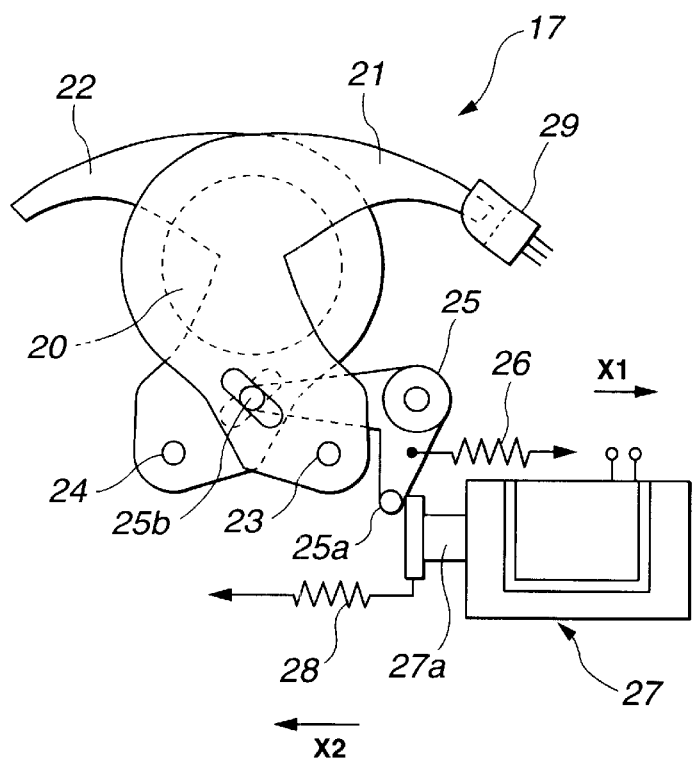
FIG. 2 shows the structure of a shutter unit included in the camera shown in FIG. 1, wherein the shutter unit is closed.
Figure 3:
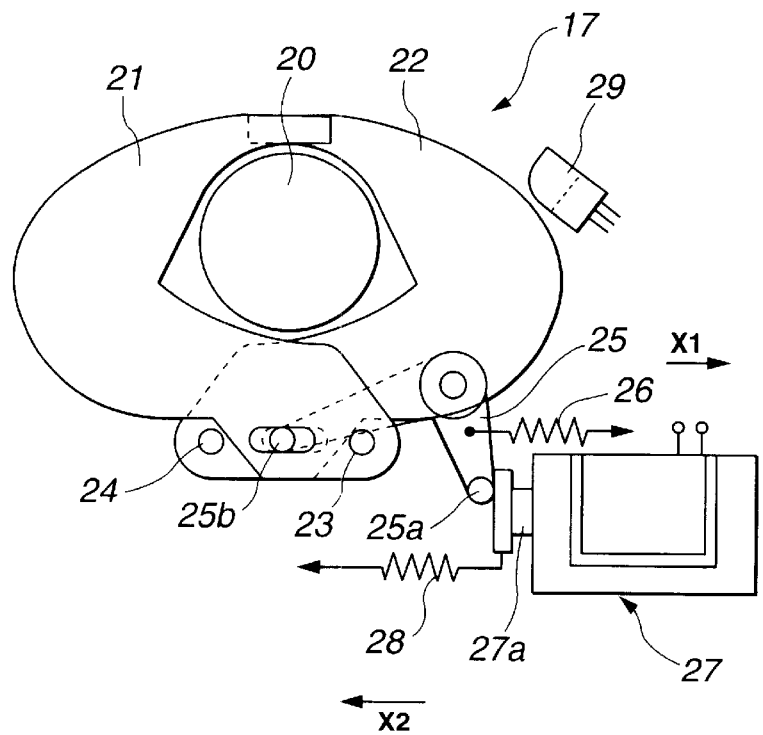
FIG. 3 shows the structure of the shutter unit included in the camera shown in FIG. 1, wherein the shutter unit is open.

The photo-interrupter 29 is secured as an integral part of the shutter base plate at a predetermined position on the shutter base plate at which the photo-interrupter 29 can sense a turn made by the sectors 21 and 22 as shown in FIG. 2 or FIG. 3. Since the photo-interrupter 29 in the camera of the present embodiment is located at the predetermined position, when the aperture 20 is closed by the sectors 21 and 22 (state shown in FIG. 2), detection light is intercepted from the photo-interrupter 29 due to the distal part of one of the sectors 21 and 22, that is, the sector 21. Moreover, immediately before the aperture 20 starts being opened by the sectors 21 and 22, the photo-interrupter 29 is released from a light-intercepted state in which the detection light is intercepted from the photo-interrupter 29.

When the photo-interrupter 29 is released from the light-intercepted state in which the detection light is intercepted from the photo-interrupter 29, the detection light is transmitted by the photo-interrupter 29. Now, the photo-interrupter 29 generates an on-state signal. In the camera of the present embodiment, the on-state signal is therefore generated immediately before the aperture 20 starts being opened. The on-state signal is transmitted to the control circuit 11. The control circuit 11 receives the on-state signal as a triggering signal indicating that an exposure operation should be started. The control circuit then outputs various instructions instructing execution of predetermined processing involved in the exposure operation.

Figure 4:
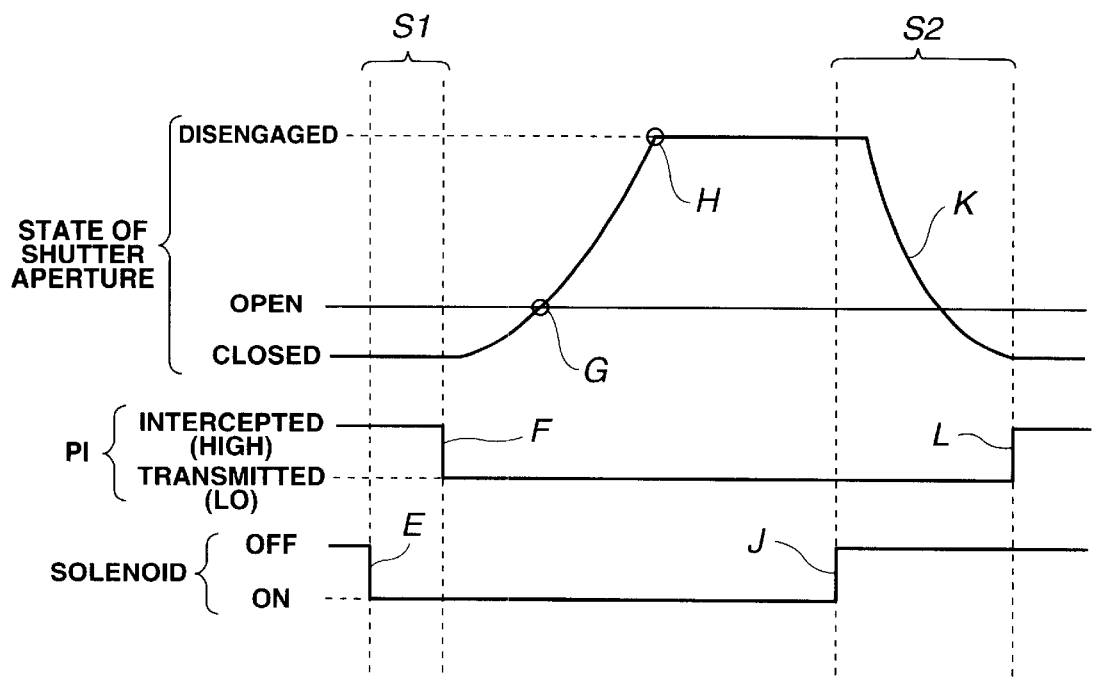
FIG. 4 is a timing chart indicating the relationship between the state of a shutter aperture and an output signal of a photo-interrupter to be attained when a solenoid is powered in order to drive the shutter unit included in the camera shown in FIG. 1.

Referring to FIG. 2, FIG. 3, and FIG. 4, the relationship among an operation exerted by the shutter unit 17, the state of the shutter aperture 20, and an output signal of the photo-interrupter 29 will be described below.

To begin with, powering the solenoid 27 included in the shutter unit 17 is started (the solenoid is turned on) (see E in FIG. 4). This causes the plunger 27a to move in the direction of suction (direction of arrow X1 in FIG. 2) against the constraining force of the repulsion spring 28. The sector lever 25 is then rotated counterclockwise in FIG. 2 due to the constraining force of the aperture spring 26. Accordingly, the pin 25b implanted in one arm of the sector lever 25 moves and the sectors 21 and 22 turn in the predetermined directions. The aperture 20 closed by the sectors 21 and 22 to bring the photo-interrupter to the light-intercepted state shifts to an open state.

In this case, immediately before the aperture 20 starts being opened, the distal part of the sector 21 withdraws to release the photo-interrupter 29 from the light-intercepted state. The detection light is transmitted by the photo-interrupter 29. Accordingly, an output signal of the photo-interrupter 29 makes a high-to-low transition (F in FIG. 4). The high-level output signal indicates light interception, while the low-level output signal indicates light transmission. The closed state of the aperture 20 attained by the sectors 21 and 22 and associated with the light-intercepted state of the photo-interrupter starts being released at a time instant G (open) in FIG. 4. The aperture 20 is fully opened at a time instant H (disengaged). The state attained this time is shown in FIG. 3.

Thereafter, powering the solenoid 27 is stopped (the solenoid 27 is turned off) (see J in FIG. 4). The plunger 27a is then moved in the direction of arrow X2 in FIG. 3 due to the constraining force of the repulsion spring 28. This causes the sector lever 25 to rotate clockwise in FIG. 3. Consequently, the sectors 21 and 22 gradually shift to close the aperture (see K in FIG. 4).

When the distal part of the sector 21 advances as shown in FIG. 2 to intercept light from the photo-interrupter 29, the output signal of the photo-interrupter 29 makes a low-to-high transition (L in FIG. 4). With the output signal, it is detected that the aperture 20 is fully closed by the sectors 21 and 22. An operation to be exerted by the normally operating shutter unit 17 has been described so far.

The shutter unit 17 acts as mentioned above. If the shutter unit 17 acts abnormally for some reason, an abnormality presumably occurs in the output signal of the photo-interrupter 29. It is therefore possible to sense an abnormal action of the shutter unit 17 by monitoring the signal output from the photo-interrupter 29 while the shutter unit 17 is in operation.

Assume that the shutter unit 17 becomes abnormal for some reason and the sectors 21 and 22 act abnormally. In this case, an abnormality occurs in the output signal of the photo-interrupter 29. The abnormality in the output signal is thought to manifest itself in three forms described below.

In the first form, the output signal of the photo-interrupter 29 is driven low before the solenoid 27 is powered.

In the second form, the output signal of the photo-interrupter 29 does not make a high-to-low transition within a predetermined time (S1 in FIG. 4) after the solenoid 27 is powered.

In the third form, the output signal of the photo-interrupter 29 does not go back to high within the predetermined time (see S2 in FIG. 4) after powering the solenoid 27 is stopped.

In the first form, presumably, the sectors 21 and 22 of the shutter unit 17 have failed while being left open. An exposed screen of a film opposed to the aperture 20 is presumably exposed.

In the second form, the abnormality is presumably caused by the opening actions of the sectors 21 and 22, which are included in the shutter unit 17. An exposure operation may therefore not be executed normally.

In the third form, the closing action of the shutter unit is presumably abnormal. Exposure may not be carried out properly. Besides, the shutter unit may be left open and object light may be kept irradiated to an exposed screen of a film.

As mentioned above, the control circuit 11 fills the role of a detector for detecting an abnormality in a predetermined action of a camera according to the output signal of the photo-interrupter 29.

Figure 5:
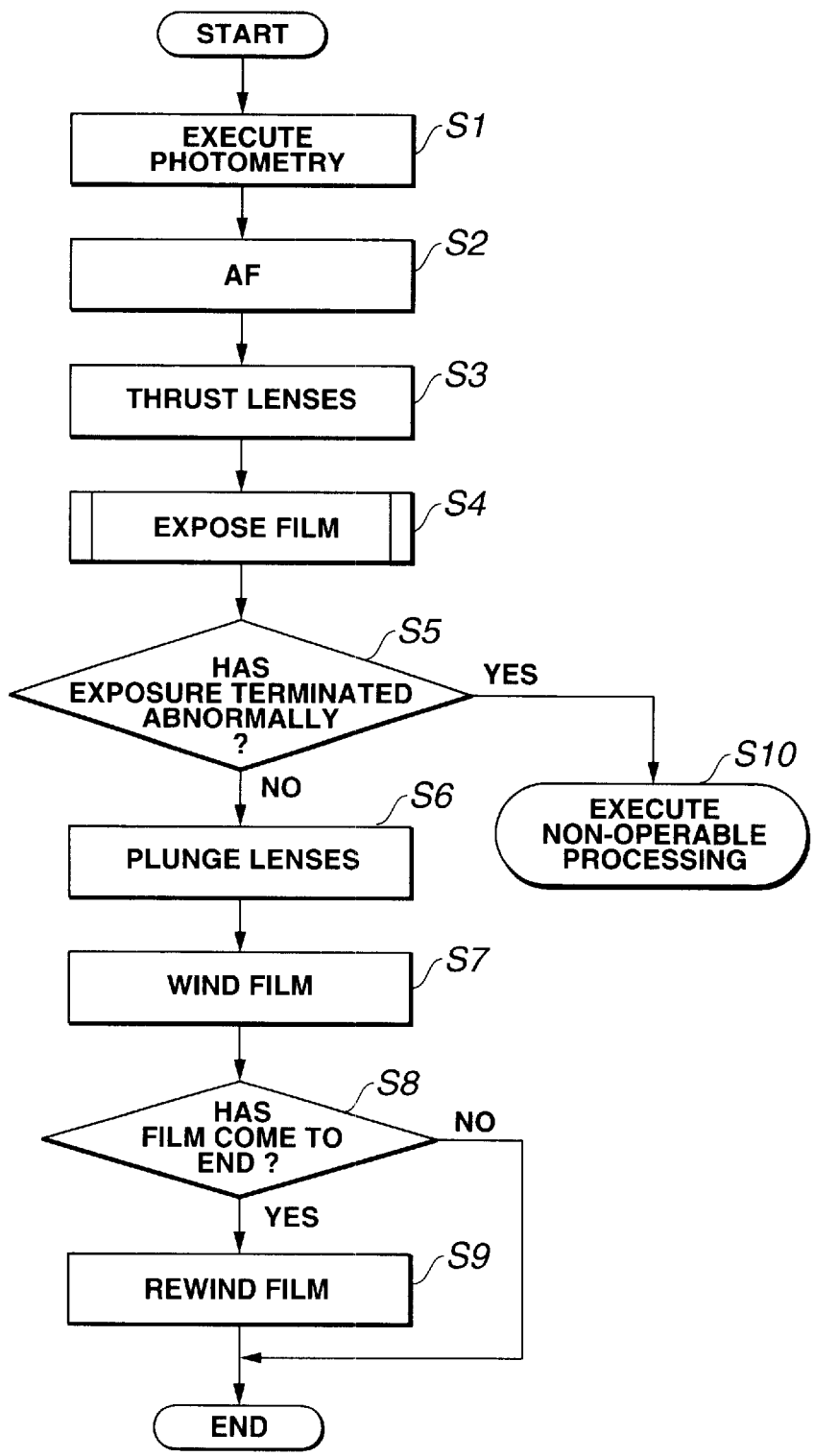
FIG. 5 is a flowchart describing basic operations to be executed when the camera shown in FIG. 1 performs photography.

Next, a description will be made of a section for judging whether the shutter unit 17 is abnormal. Basic operations involved in photography to be performed by the camera of the present embodiment will be described in conjunction with the flowchart of FIG. 5.

When a barrier member covering the face of the camera is opened, a main power switch interlocked with the barrier member is turned on. Consequently, the camera becomes ready to photograph.

Assume that a user of the camera presses a release button (not shown) that is a manipulation member interlocked with a release (REL) switch 31. An instruction signal (release signal) instructing start of an exposure operation is then generated by the release switch 31, and then transmitted to the control circuit 11. The control circuit 11 in turn starts running predetermined photographing operation programs.

At step S1, photometry is executed. During the photometry, a photometry circuit (not shown) located at a predetermined position inside the camera measures the luminance of an object according to received object light. Based on the luminance of the object, a shutter drive time required for achieving exposure properly is calculated and whether flashlight is needed is determined. When flashlight is needed, a flashing time is calculated.

At step S2, an automatic focusing section included in the camera (not shown) is used to measure a distance of the camera from a desired object and calculate distances by which photographic lenses should be thrust and thus focused on the object.

At step S3, the photographic lenses are moved (thrust) to their predetermined positions according to the results of automatic focusing carried out at step S2.

At step S4, an exposure operation or sequence (to be detailed later) (see FIG. 6) is executed. Control is then passed to step S5. At step S5, the control circuit 11 judges from the output signal of the photo-interrupter 29 whether the exposure operation of step S4 has terminated normally (see FIG. 6). In other words, the control circuit 11 also fills the role of a judging means for judging whether the exposure operation (a photographing operation) has terminated abnormally.

If it is judged that the exposure operation has terminated abnormally, control is passed to a non-operable processing sequence of step S10. In other words, if the control circuit 11 judges that the exposure (photographing) operation has terminated abnormally, the control circuit 11 operates as an operation disabling means for disabling a predetermined operation of the camera.

If it is judged that the exposure operation has terminated normally, control is passed to the next step S6.

At step S6, a lens plunge operation for moving the photographic lenses thrust at step S3 to predetermined positions is executed. Control is then passed to the next step S7. At step S7, the control circuit 11 drives the film feed unit 18 using the motor drive circuit 16. The control circuit 11 then executes a film feed operation for feeding a film by one frame so that a frame to be exposed next will be located at a predetermined position (a film wind operation).

At step S8, the control circuit 11 judges from an output of the film detection circuit 15 whether the film has come to an end, or in other words, whether the exposure operation executed at step S4 has been performed on the last frame of the film. If the film has come to an end, control is passed to the next step S9. At step S9, the control circuit 11 drives the film feed unit 18 using the motor drive circuit 16. The control circuit 11 then executes the film feed (film rewind) operation for rewinding the exposed film into the film cartridge. Thereafter, the series of operations is terminated (end).

In contrast, if it is judged at step S8 that the film has not come to an end, step S9 is not executed but the series of operations is terminated. The camera then stands by for the next photography.

Figure 6:
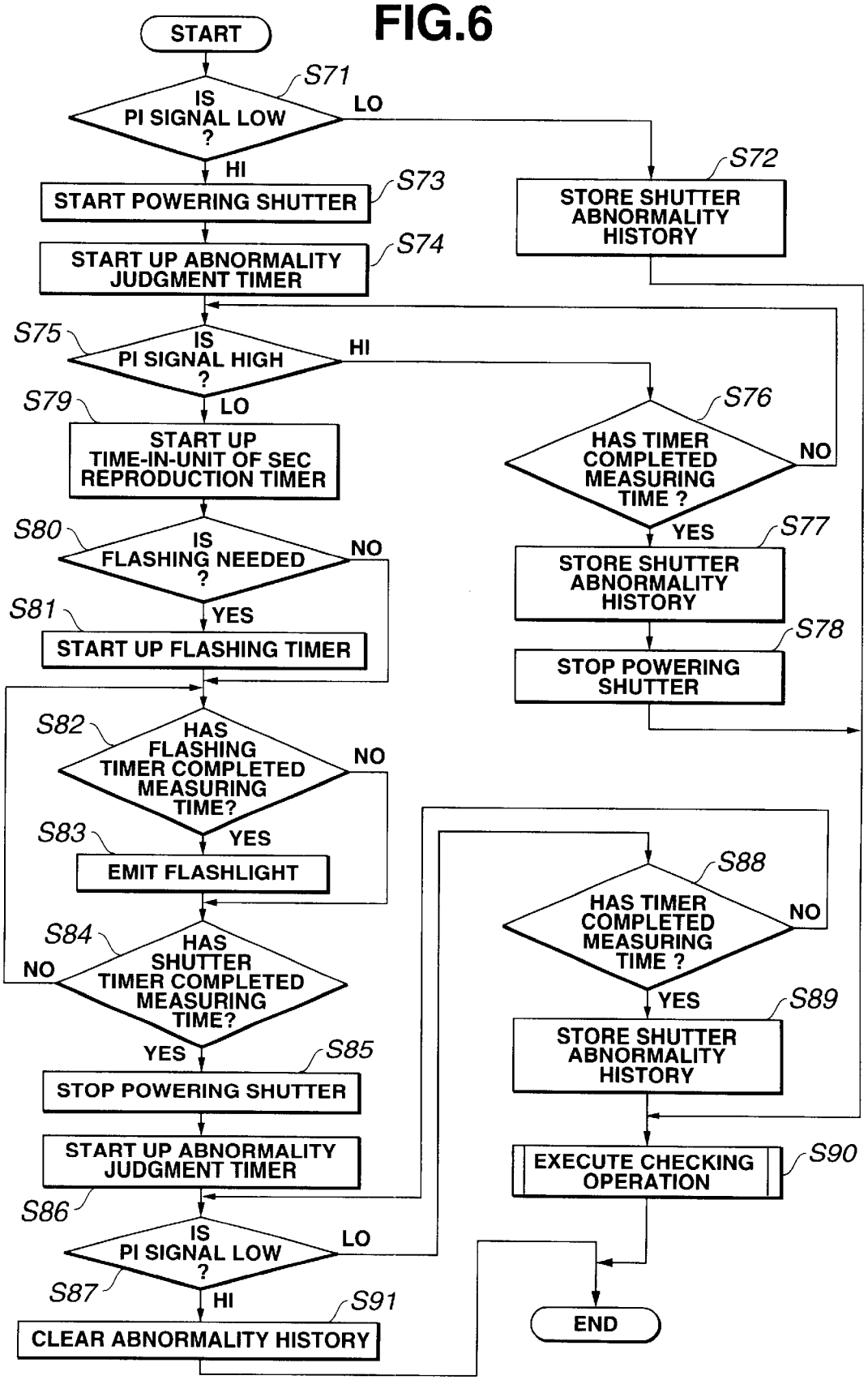
FIG. 6 is a flowchart describing an exposure sequence to be executed in the camera shown in FIG. 1.

Next, the exposure sequence to be carried out in the camera will be detailed in conjunction with the flowchart of FIG. 6. The exposure sequence is a subroutine carried out as step S4 in FIG. 5.

At step S71, the control circuit 11 checks an output signal of the photo-interrupter 29 using the shutter detection circuit 13. At this time, the shutter unit 17 has not been driven. If operations had been carried out normally, the output signal of the photo-interrupter 29 must be high.

If it is confirmed that the output signal of the photo-interrupter 29 is high, control is passed to step S73. If it is confirmed that the output signal of the photo-interrupter 29 is low, it means that the shutter unit 17 (sectors 21 and 22) is opened at any step before the shutter unit 17 is driven for this exposure operation. It is judged that an abnormality has already occurred in the shutter unit 17. The exposure operation is then disabled, and control is passed to step S72. At step S72, history information indicating that an abnormality has occurred in an action of the shutter unit is stored in the predetermined memory (not shown). Control is then passed to a check operation or sequence (to be detailed later) (see FIG. 7) of step S90.

When control is passed to step S73 according to the judgment made at step S71, the control circuit 11 starts powering the solenoid 27 using the shutter drive circuit 14 at step S73. This causes the plunger 27a to start suction. Thus, driving for disengaging the sectors 21 and 22 from each other is started.

Concurrently with the step S73, that is, the start of powering the solenoid 27, the control circuit 11 causes its own abnormality judgment timer (not shown) to start measuring a time at step S74.

At step S75, the control circuit 11 monitors the state of the output signal of the photo-interrupter 29. If the output signal of the photo-interrupter 29 is low, that is, if it is sensed that the output signal has made a high-to-low transition, control is passed to the next step S79. If it is sensed that the output signal of the photo-interrupter 29 remains high, control is passed to step S76.

At step S76, the state of the abnormality judgment timer started up at step S74 is checked. The processing of steps S75 and S76 is repeated until a predetermined time has elapsed.

At step S76, if it is confirmed that the predetermined time has elapsed, it is judged that the sectors 21 and 22 are not in action. Control is then passed to the next step S77.

At step S77, execution of subsequent exposure-related actions is disabled, and history information indicating that an abnormality has occurred in an action of the shutter unit is stored in the predetermined memory (not shown). Control is then passed to the next step S78. At step S78, powering the solenoid 27 is stopped, and then control is passed to the check sequence (see FIG. 7) of step S90.

Assume that it is sensed at step S75 that the output signal of the photo-interrupter 29 is driven low and that the sector 21 starts acting normally. In this case, control is passed to step S79. At step S79, the control circuit 11 allows its own exposure time-in-unit of sec reproduction time (not shown) to start measuring a time.

At step S80, the control circuit 11 judges from the results of the photometry (step S1 in FIG. 5) whether flashing is needed. If it is judged that flashlight is needed, control is passed to step S81. If it is judged that flashlight is not needed, control is passed to step S82.

At step S81, the control circuit 11 allows a timer for indicating the timing of flashing to start measuring a time, and then passes control to step S82.

At step S82, it is checked if the timer started up at step S81 has completed measuring a time. If it is confirmed that the timer has completed measuring a time, control is passed to step S83. If the timer has not completed measuring a time, control is passed to step S84.

At step S83, the control circuit 11 drives a flashing unit (not shown) using a flashing circuit (not shown) and executes a predetermined flashing action.

At step S84, it is checked if the shutter timer (exposure time-in-unit of sec reproduction timer) that has started measuring a time at step S79 has completed measuring the time. If the timer has not completed measuring the time, control is returned to step S82. The subsequent processing is then repeated until the timer completes measuring the time. If it is confirmed that the timer has completed measuring the time, control is passed to step S85.

At step S85, the control circuit 11 stops powering the solenoid 27. This causes the sectors 21 and 22 to start a closing action for closing the aperture 20.

Concurrently, at step S86, the control circuit 11 allows its own abnormality judgment timer (not shown) to start measuring a time, and passes control to the next step S87.

At step S87, the control circuit 11 monitors the state of the output signal output from the photo-interrupter 29. If it is sensed that the output signal of the photo-interrupter 29 is driven high, control is passed to the next step S91. If it is sensed that the output signal of the photo-interrupter 29 remains low, control is passed to step S88.

At step S88, it is checked if the abnormality judgment timer that has been started to measure a time at step S86 has completed measuring the time, that is, if the predetermined time has elapsed. The processing of steps S87 and S88 is repeated until the predetermined time has elapsed.

If it is confirmed at step S88 that the predetermined time has elapsed, it is judged that the sectors 21 and 22 have not shifted to close the aperture. Control is then passed to the next step S89. At step S89, history information indicating that an abnormality has occurred in the closing action of the shutter unit is stored in the predetermined memory (not shown). Control is then passed to the checking sequence (see FIG. 7) of step S90.

At step S90, the control circuit 11 executes the checking sequence for checking an action again. The checking sequence of step S90 is executed only when any abnormality is identified during the exposure operation. The control circuit 11 thus fills the role of a checking means that executes the checking operation other than the predetermined operations of the camera responsively to detection of an abnormality in an operation.

If it is sensed at step S87 that the output signal of the photo-interrupter 29 is driven high, it means that the exposure operation has terminated normally. Control is then passed to the next step S91. At step S91, the control circuit 11 initializes abnormality history information in the predetermined memory (not shown), and then terminates (ends) the series of actions.

Figure 7:
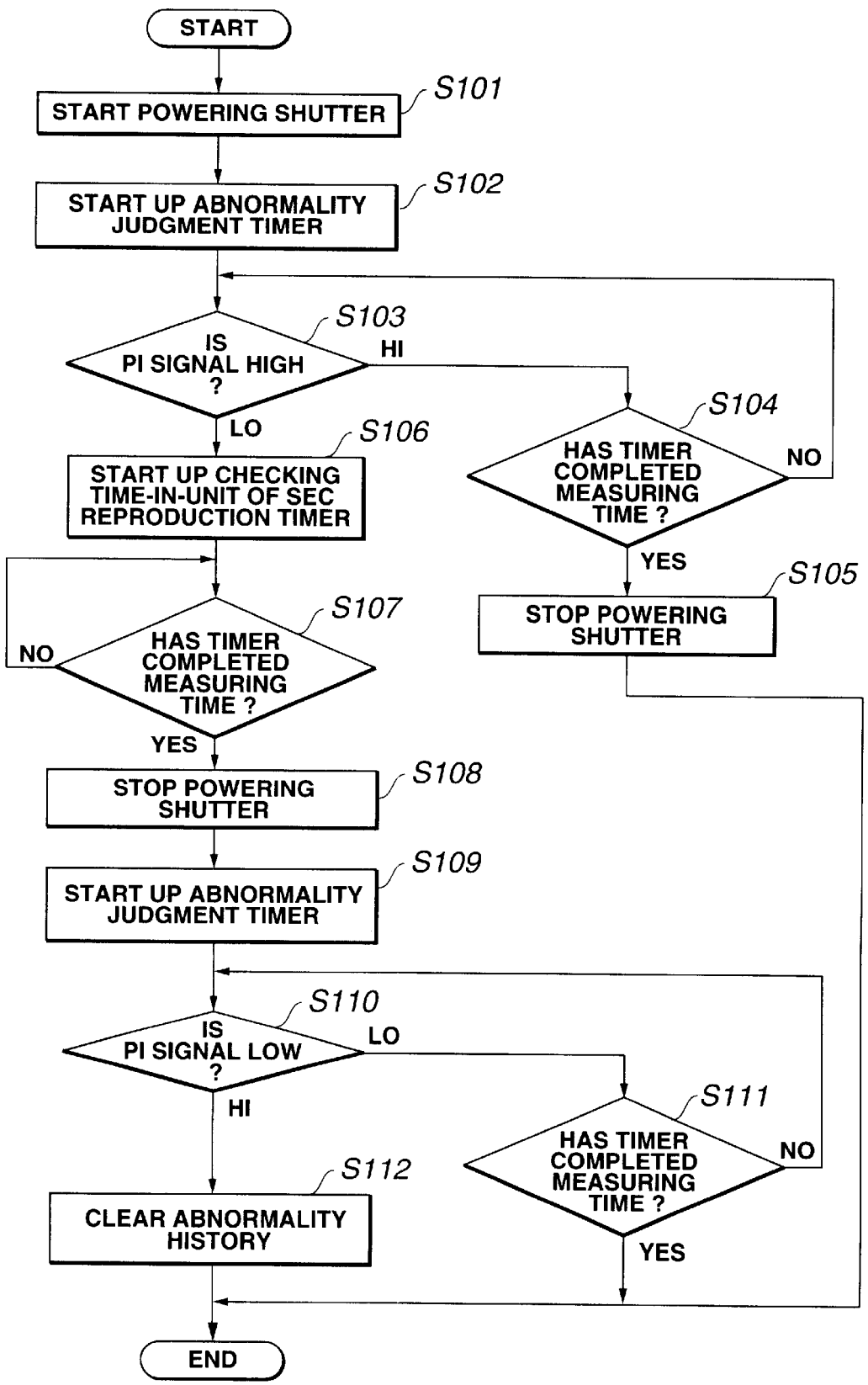
FIG. 7 is a flowchart describing a checking sequence to be executed when an abnormality is detected in an exposure operation of the camera shown in FIG. 1.

The checking sequence to be executed when the exposure operation of the camera terminates abnormally will be detailed in conjunction with the flowchart of FIG. 7. The checking sequence is a subroutine to be carried out at step S90 in FIG. 6.

At step S101, the control circuit 11 starts powering the solenoid 27 using the shutter drive circuit 14. This causes the plunger 27a to start suction. Driving for disengaging the sectors 21 and 22 from each other is started.

Unlike the aforesaid exposure operation (see FIG. 6), the solenoid 27 is powered irrespective of the level of the output signal of the photo-interrupter 29. If it is judged that an abnormality has occurred at step S71 within the aforesaid exposure operation, the shutter unit 17 is driven forcibly as described later in the hope that the shutter unit 17 may be restored to its normal state.

Concurrently with the processing of step S101, that is, the start of powering the solenoid 27, the control circuit 11 allows it own abnormality judgment timer (not shown) to start measuring a time at step S102. The time to be measured by the timer is a relatively long time unlike the one to be measured during the normal exposure operation. The solenoid is thus powered for a longer time because it may facilitate detection of an abnormality and it may give the sectors 21 and 22 of the shutter unit 17 a chance to be restored to their normal states.

At step S103, the control circuit 11 monitors the state of the output signal output from the photo-interrupter 29. If it is sensed that the output signal of the photo-interrupter 29 is low, control is passed to the next step S106. If it is sensed that the output signal of the photo-interrupter 29 is high, control is passed to step S104.

If the checking sequence is called because, for example, the shutter unit has failed while being open, the output signal of the photo-interrupter 29 remains low. In this case, control is passed to step S106.

At step S104, the state of the abnormality judgment timer started up at step S102 is checked. The processing of steps S103 and S104 is repeated until the predetermined time has elapsed.

At step S104, if the control circuit 11 confirms that the predetermined time has elapsed, the control circuit 11 judges that the sectors 21 and 22 have not acted at all despite powering performed at step S101, and passes control to the next step S105. At step S105, the control circuit 11 stops powering the solenoid 27 and terminates the checking sequence.

If it is confirmed at step S103 that the output signal of the photo-interrupter 29 is driven low, the sector 21 is thought to start acting normally. Control is then passed to step S106.

At step S106, the control circuit 11 allows its own checking time-in-unit of sec reproduction timer (not shown) to start measuring a time. The time to be measured is a sufficiently long time that is long enough to open the sectors 21 and 22. During the long time, the sectors 21 and 22 are driven to move a full stroke in order to check if the sectors act abnormally.

At step S107, it is checked if the timer started up at step S106 has measured a predetermined time, that is, the predetermined time has elapsed. If the predetermined time has elapsed, control is passed to the next step S108.

At step S108, the control circuit 11 stops powering the solenoid 27. This causes the sectors 21 and 22 to start a closing action for closing the aperture 20.

Concurrently, at step S109, the control circuit 11 allows its own abnormality judgment timer (not shown) to start measuring a time, and then passes control to the next step S110.

At step S110, the control circuit 11 monitors the state of the output signal of the photo-interrupter 29. If it is sensed that the output signal of the photo-interrupter 29 is driven high, control is passed to the next step S112. If it is sensed that the output signal of the photo-interrupter 29 remains low, control is passed to step S111.

At step S111, it is checked if the abnormality judgment timer started up at step S109 has measured a predetermined time, that is, the predetermined time has elapsed. The processing of steps S110 and S111 is repeated until the predetermined time has elapsed.

If it is confirmed at step S111 that the predetermined time has elapsed, it is judged that the sectors 21 and 22 remain intact with the aperture left open but do not shift to close the aperture. The checking sequence is then terminated.

If it is sensed at step S110 that the output signal of the photo-interrupter 29 is high, it is judged that the sectors 21 and 22 that have shifted to close the aperture and that the shutter unit has been restored to its normal state. Control is then passed to the next step S112. At step S112, abnormality history information concerning the action of the shutter unit is initialized, and the checking sequence is terminated.

As mentioned above, according to the present embodiment, if it is detected that the shutter unit acts abnormally, the checking sequence is executed for tentatively driving the shutter unit 17. It is checked again if the shutter unit acts abnormally. Consequently, the reliability in judging an abnormality attributable to the failure of the shutter unit 17 can be improved.

The checking sequence to be executed when an abnormality occurs during the exposure operation of the camera (subroutine to be carried out at step S90 in FIG. 6) (see FIG. 7) may be different from the contents of the flowchart of FIG. 7 but may be carried out as described below.

Figure 8:
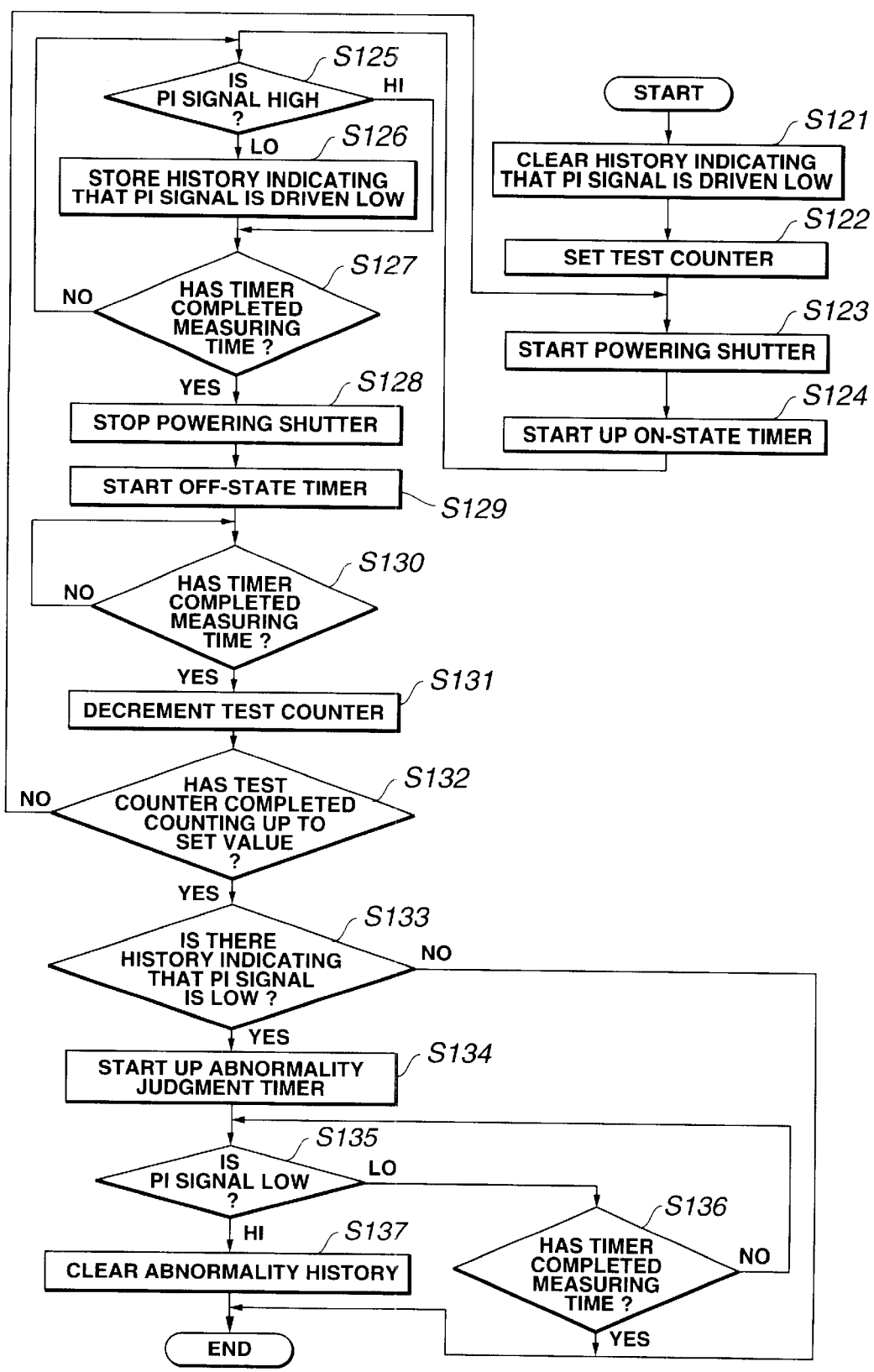
FIG. 8 is a flowchart describing a variant of the checking operation to be executed when an abnormality is detected in the exposure operation of the camera in accordance with an embodiment of the present invention.

FIG. 8 is a flowchart describing a variant of the checking sequence to be executed when an abnormality occurs during the exposure operation of the camera of the present embodiment. According to this variant, if an abnormally is detected during the exposure operation, additional processing is carried out for forcibly opening or closing the shutter unit (sectors 21 and 22) repeatedly a plurality of times for a short period of time. Thus, a test operation for giving the shutter unit a chance to be restored to its normal state is added to the checking sequence. The configuration of the camera itself is substantially identical to that of the aforesaid embodiment. The description of this configuration will be omitted. The same reference numerals will be employed, if necessary, in the description below.

Assume that the checking sequence is called for at step S90 in FIG. 6. As described in FIG. 8, at step S121, the control circuit 11 initializes information concerning the output signal of the photo-interrupter 29 stored in the predetermined memory (not shown). In other words, if the output signal of the photo-interrupter 29 is driven low even once to indicate that light is transmitted by the photo-interrupter 29, the fact is stored in the memory. At step S121, history information indicating that the output signal has been driven low is cleared.

At step S122, the control circuit 11 sets a test counter (not shown) for counting the number of test times by which the opening and closing action of the shutter unit is tested. The test counter is incorporated in, for example, the control circuit 11.

At step S123, the control circuit 11 starts powering the solenoid 27 using the shutter drive circuit 14. This causes the plunger 27a to start suction. Driving for disengaging the sectors 21 and 22 from each other is started, that is, the opening and closing action of the shutter unit is started. The opening and closing action of the shutter unit is, unlike the one performed during the normal exposure operation, forcibly executed irrespective of the level of the signal output from the photo-interrupter 29.

Concurrently with the start of powering the solenoid 27 at step S123, at step S124, the control circuit 11 allows a timer for measuring a powering time (not shown) to start measuring the time.

At step S125, the control circuit 11 checks the output signal of the photo-interrupter 29 using the shutter detection circuit 13. If the output signal is low, control is passed to the next step S126. If the output signal is high, control is passed to step S127.

At step S126, the control circuit 11 stores information, which indicates that the output signal of the photo-interrupter 29 is low, in the predetermined memory (not shown). If the output signal of the photo-interrupter 29 is driven low even once with the solenoid 27 kept powered in order to indicate that light is transmitted by the photo-interrupter, or in other words, if the sectors 21 and 22 are disengaged from each other, information indicating the fact is stored.

At step S127, the control circuit 11 checks the timer for measuring a powering time, during which the solenoid 27 is powered, which is started up at step S124. If the timer has measured a predetermined powering time, that is, the predetermined powering time has elapsed, control is passed to step S128. If the predetermined powering time has not been elapsed, control is returned to the step S125 and checking the output signal of the photo-interrupter 29 is continued.

If the predetermined powering time has elapsed, control is passed to step S128. At step S128, the control circuit 11 stops powering the solenoid 27, and then passes control to the step S129.

Concurrently with the processing of step S128 (stopping powering the solenoid), at step S129, the control circuit 11 starts up an off timer for measuring a powering pause time.

At step S130, a standby state is attained in order to wait for the off timer started up at step S129 to complete measuring a time. In short, the shutter unit (sectors 21 and 22) acts to close the aperture during the standby period.

If the predetermined powering pause time has elapsed, control is passed to step S131. At step S131, the control circuit 11 judges from the processing of steps S123 to S130 that driving the shutter unit to open and close the aperture has completed. The control circuit 11 then decrements the count value of the test counter, which counts the number of test times by which the opening and closing action of the shutter unit is tested, by one.

At the next step S132, the control circuit 11 checks if the count value of the test counter is a pre-set value, that is, if the opening and closing action of the shutter unit has been tested by a pre-set number of test times. If it is confirmed that the opening and closing action has not been tested by the number of test times, control is returned to step S123. The shutter unit is driven again in order to open and close the aperture. If the opening and closing action thereof has been tested by the pre-set number of test times and the count value equals to the pre-set value, control is passed to the next step S133.

At step S133, the control circuit 11 references the history information stored in the memory so as to check if the output signal of the photo-interrupter 29 has been driven low.

Assume that while the opening and closing action of the shutter unit is repeated a plurality of times, that is, while powering the solenoid 27 is under way, the sectors 21 and 22 have been disengaged from each other even once. In this case, history information indicating that the output signal of the photo-interrupter 29 has been driven low must have been stored in the memory at step S126.

If history information indicating that the output signal of the photo-interrupter has been driven low is not found at step S133, it means that although the shutter unit has repeatedly been driven to open and close the aperture, the sectors 21 and 22 have not moved to open the aperture. In this case, the shutter abnormality history is left intact, and the checking sequence is terminated.

At step S133, if the history information indicating that the output signal of the photo-interrupter has been driven low is found, control is passed to step S134. At step S134, the control circuit 11 allows the abnormality judgment timer to start measuring a time.

At step S135, the control circuit 11 checks the state of the output signal of the photo-interrupter 29. If the output signal is high, control is passed to step S137. If the output signal remains low, control is passed to step S136.

At step S136, the state of the abnormality judgment timer started up at step S134 is checked. If it is confirmed that the predetermined time has elapsed, it is judged that the sectors 21 and 22 have not moved to close the aperture. The checking sequence is then terminated. If the abnormality judgment timer has not yet measured the predetermined time, that is, the predetermined time has not elapsed, control is returned to the step S135. The output signal of the photo-interrupter 29 is then checked and the abnormality judgment timer is checked.

If it is confirmed at step S135 that the output signal of the photo-interrupter 29 has made a low-to-high transition, control is passed to step S137. In this case, it is judged that the sectors 21 and 22 have moved to open the aperture and the shutter unit has been restored to its normal state. At step S137, the control circuit 11 therefore initializes the abnormality history concerning the action of the shutter unit and terminates the checking sequence.

As mentioned above, according to the above-described variant, the shutter unit 17 is forcibly driven a plurality of times repeatedly for a short period of time. When a frivolous defect caused by, for example, dust or clogging has occurred in the shutter unit 17 or a gear or any other mechanism, the defect can be overcome readily through the repeated driving of the shutter unit. Once such a frivolous defect is overcome during the checking sequence described in FIG. 8, the defect will never affect any subsequent operation.

As for the checking operation to be executed when an abnormality occurs during the exposure operation of the camera of the embodiment (subroutine to be carried out at step S90 in FIG. 6) (see FIG. 7), another variant is conceivable.

FIG. 9 is a flowchart describing another variant of the checking operation to be executed when an abnormality occurs during the exposure operation of the camera. According to this variant, the processing of checking the solenoid 27 for disconnection according to a voltage developed at a supply battery is added to the checking operation (see FIG. 7). The processing of checking the solenoid 27 for disconnection is, as described in FIG. 9, comprised of four steps (steps S113 to S116) additionally inserted between the step S101 in FIG. 7 and the step S102. The other steps have the same step numbers as those in FIG. 7. The description of the same steps as those described in relation to the previous embodiment will therefore be omitted. Only the different steps (of checking disconnection) will be described below.

The configuration of the camera itself is substantially identical to that in accordance with the first-described embodiment. The description of the configuration will therefore be omitted. The components will be described if necessary with the same reference numerals assigned thereto.

At step S101, powering the solenoid 27 is started. Thereafter, control is passed to step S113. At step S113, the control circuit 11 allows a timer, in which a predetermined time required to stabilize the power supply is pre-set, to start measuring a time.

At step S114, a standby state is attained in order to wait for the timer started up at step S113 to complete measuring a time, or in other words, to wait until the power supply is stabilized.

When it is confirmed using the timer that the predetermined time has elapsed, control is passed to the next step S115. At step S115, the control circuit 11 measures a voltage developed at the power supply using a supply voltage detection circuit (not shown). The supply voltage detection circuit detects a voltage developed at a battery serving as the power supply for powering all the circuits and actuators in the camera. A fragment of the battery voltage is produced using resistors (not shown) and measured. The measured value is digitized and then output to the control circuit 11.

At the next step S116, it is checked if the measured value of the supply voltage that is obtained at step S115 falls within a range of predetermined standard values. In this case, if the solenoid 27 is not disconnected but is normal, a large current flows. At this time, the supply voltage drops because of an impedance occurring in the battery. When a voltage drop is limited, or in other words, when the supply voltage falls outside the range of predetermined standard values, the solenoid 27 is predicted to be disconnected.

If it is found at step S116 that the measured value of the supply voltage falls outside the range of predetermined standard values (is not a standard value), the solenoid 27 is judged to be disconnected. The checking sequence is then terminated.

If it is confirmed at step S116 that the measured value of the supply voltage falls within the range of predetermined standard values, control is passed to the next step S102. The subsequent processing is then executed.

As mentioned above, according to the another variant, the processing of checking for an abnormality item to be detected, that is, checking the solenoid 27 for disconnection is added. Consequently, an abnormality detection operation can be carried out with higher precision.

In the aforesaid embodiment and variants, a predetermined action of the camera has been described by taking an action of the shutter unit for instance. The predetermined action is not limited to this one. That is to say, the predetermined action may not be any action involved in the exposure operation, such as, the action of the shutter unit or the action of the aperture blades. Alternatively, the predetermined action may be any action involved in the film feed operations, the clutch switching operation for switching destinations of driving force, the pop-up strobe unit thrust/plunge operation, the photographic lenses drive operation, and the automatic open/close lens barrier open/close operation. The photographic lenses drive operation involves the power varying action of a zoom lens and the focusing action of a focusing lens.

According to the present invention, it is apparent that a wide range of different embodiments can be formed based on the invention without a departure from the spirit and scope of the invention. This invention will be limited by the appended claims but not restricted by any specific embodiments.

What is claimed is:

1. A camera capable of detecting an abnormality comprising:

photographing exposure operation control means for controlling an open and close exposure operation of a shutter mechanism in accordance with an exposure amount that is determined based on photographing information;

checking operation control means for controlling an open and close check operation of said shutter mechanism which is different from the open and close exposure operation of said check mechanism;

abnormality detecting means for detecting an abnormality during the open and close exposure operation of said shutter mechanism controlled by said photographing exposure operation control means;

a memory which stores abnormality history information relating to abnormalities detected by said abnormality detecting section; and abnormality judging means for causing said checking operation control means to automatically cause the open and close check operation of said shutter mechanism to be performed when an abnormality has been detected by said abnormality detecting means, and for then judging whether or not an abnormality has occurred in said shutter mechanism.

2. A camera according to claim 1, wherein the open and close exposure operation of said shutter mechanism controlled by said photographing operation control means and the open and close check operation of said shutter mechanism controlled by said checking operation control means are continuously performed during one exposure operation.

3. A camera according to claim 1, wherein the open and close check operation of said shutter mechanism controlled by said checking operation control means is set such to have a longer operation time than the open and close exposure operation of said shutter mechanism controlled by said photographing exposure operation control means.

4. A camera according to claim 1, wherein said checking operation control means controls the open and close check operation of said shutter mechanism to be performed a plurality of times.

5. A camera according to claim 1, wherein said abnormality judging means detects whether a sector of said shutter mechanism is positioned at a normal position corresponding to a drive signal for opening and closing said shutter mechanism.

6. A camera capable of detecting an abnormality of a photographing operation, comprising:

a photographing operation control section which operates an operation mechanism based on a photographing condition if a photographing operation is initiated by a manipulation performed for initiating the photographing operation;

a checking operation control section which operates said operation mechanism based on a predetermined operation condition that is different from the photographing condition;

an abnormality detecting section which detects that an abnormality in operation has occurred during the operation of said operation mechanism controlled by said photographing operation control section; and an abnormality judging section which automatically and forcibly causes the checking operation control section to operate said operation mechanism based on the predetermined operation condition when an abnormality has been detected by said abnormality detecting section, to thereby confirm whether or not an abnormality has occurred in the operation of the operation mechanism.

7. A camera according to claim 6, further comprising:

an operation disabling section which disables the operation of said operation mechanism when said abnormality judging section has judged that an abnormality has occurred in the operation of said operation mechanism; and a memory which stores abnormality history information when an abnormality has been detected in the operation of said operation mechanism by said abnormality detecting section, and wherein the operation of said operation mechanism is disabled when said abnormality judging section has judged that an abnormality has occurred in the operation of said operation mechanism, and said abnormality history information stored in said memory is cleared when said abnormality judging section has judged that the operation of said operation mechanism is normal.

8. A camera according to claim 6, wherein said operation mechanism comprises a shutter mechanism which performs an open and close operation of an exposure aperture portion as an exposure operation in accordance with an exposure amount determined based on photographing information.

9. A camera according to claim 6, wherein the operation of said operation mechanism controlled by said photographing operation control section and the operation of said operation mechanism controlled by said checking operation control section are performed continuously during one exposure operation.

10. A camera capable of detecting an abnormality of a photographing operation, comprising:

an abnormality detecting section which detects an abnormality of an operation mechanism in a series of photographing operations that is initiated by a manipulation performed for initiating the photographing operations;

a checking operation control section which forcibly actuates the operation mechanism in response to said abnormality detecting section detecting an abnormality of the operation mechanism, based on a predetermined operation condition; and an abnormality persistence judging section which judges whether or not the abnormality of said operation mechanism detected by said abnormality detecting section, which is checked by said checking operation control section, persists.

11. A camera according to claim 10, wherein said operation mechanism comprises a shutter mechanism which performs an open and close operation of an exposure aperture portion as an exposure operation in accordance with an exposure amount determined based on photographing information.

\* \* \* \* \*